Patented Oct. 8, 1946

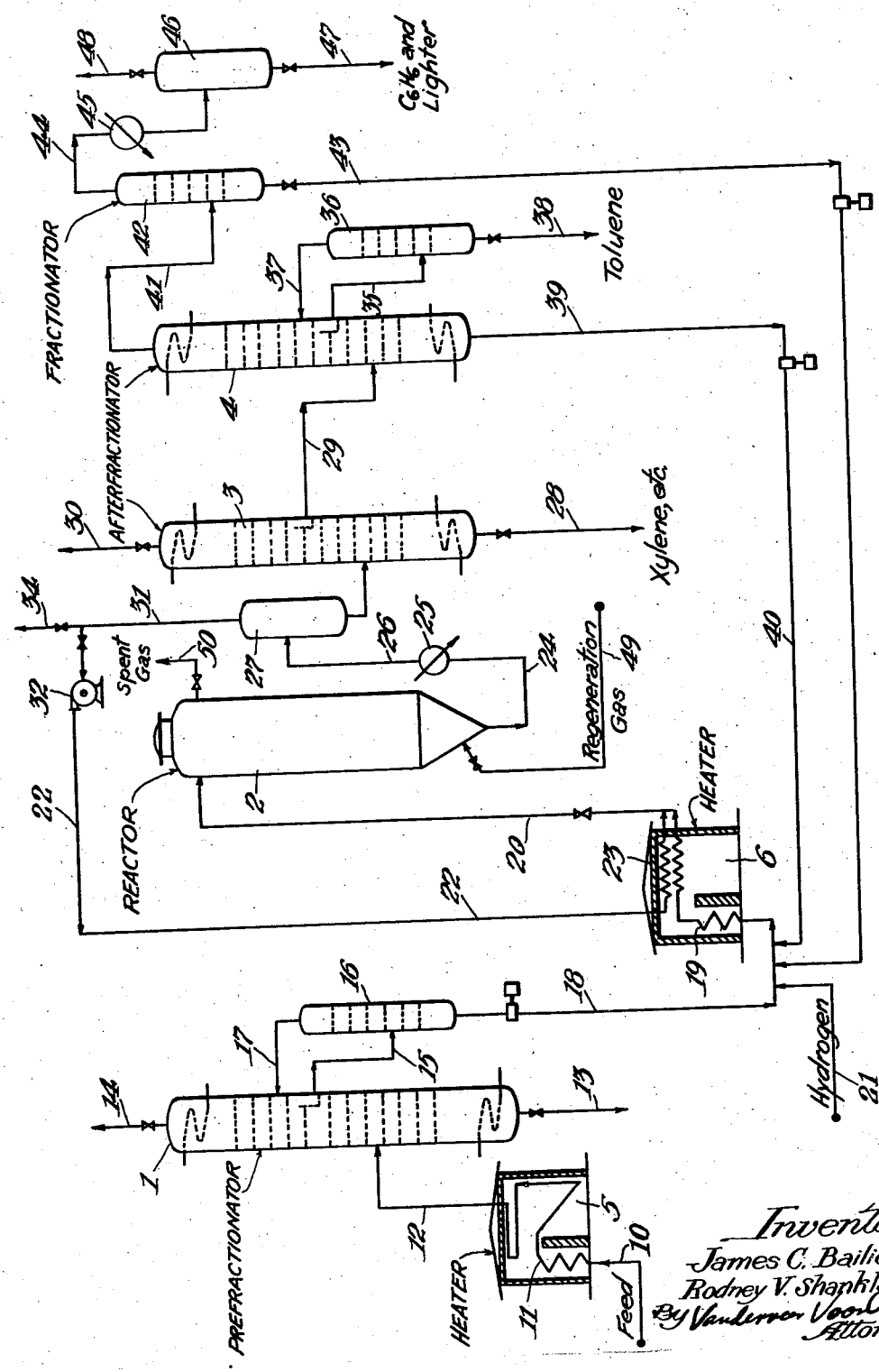

2,408,724

UNITED STATES PATENT OFFICE 2,408,724

TOLUENE PROCESS

James C. Bailie and Rodney V. Shankland, Chicago, Ill., assignors to Standard Oil Company, Chicago, Ill., a corporation of Indiana Application August 7, 1942, Serial No. 453,929

7 Claims. (Cl. 260—668)

This invention relates to a process of making toluene from petroleum hydrocarbons and more specifically to the catalytic treatment of a selected fraction of petroleum naptha at conversion temperatures and in the presence of hydrogen, employing for the purpose a catalyst which we have discovered to be unusually effective for producing toluene.

It has been known heretofore that catalytic treatment of petroleum hydrocarbons under certain conditions will produce aromatic hydrocarbons from hydroaromatics and paraffins. The aromatic hydrocarbons thus produced range all the way from benzene thru the xylenes, higher alkylated benzenes, napthalene and other condensed ring aromatic compounds. Because of the extraordinary demand for toluene in the manufacture of explosives, it has become urgently important to produce the maximum amount of toluene instead of other less desirable aromatic hydrocarbons such as benzene and xylene. The processes employed heretofore for converting petroleum napthas to aromatics have failed to yield more than about 10 to 15% of toluene based on the petroleum hydrocarbon treated when processing Mid-Continent light napthas using conventional commercial operating conditions. Furthermore, the catalysts previously employed became deactivated rather rapidly especially with respect to their toluene-producing ability. As a result of their relative instability the toluene-producing capacity averaged thruout the life of those catalysts was even considerably less than these figures would indicate. In contrast to the prior processes, our process has produced 19–20% of toluene from a selected naptha fraction which is a toluene yield 25% greater than has been producible by other processes.

One object of our invention is to provide a toluene process and catalyst for converting petroleum napthas into toluene with a higher degree of conversion than processes known heretofore. Another object is to provide a catalyst with greater stability, particularly stability toward the high temperatures employed in catalyst regeneration, thereby producing a higher level of toluene conversion over the life of the catalyst. Another object of our invention is to provide a process of converting a selected petroleum naptha into aromatic hydrocarbons which produces substantially no other hydrocarbons boiling in the region of the toluene boiling point. As a result of such clean-cut conversion, substantially pure toluene is obtainable by fractionation without the use of selective solvents or chemical reagents. A still further object of our invention is to provide a catalytic process for making toluene in which the toluene-producing activity of the catalyst is sufficiently high to enable the process to be operated at much higher capacities than has been possible heretofore. As a result the amount of toluene which can be produced in a given installation using our improved toluene directive catalyst can be two to four times the amount obtainable in the same time with catalysts heretofore employed.

Our process is illustrated by a drawing which accompanies the specification and which shows diagrammatically an apparatus for carrying out the process.

Referring to the drawing, the apparatus shown represents a prefractionator 1, a catalytic reactor 2, and after fractionators 3 and 4. Heaters 5 and 6 may suitably be pipe heaters in which coils of tubing are placed within a furnace setting and the material heated is forced thru the coils.

The stock employed for our process is preferably a close-cut straight-run naptha fraction from crude petroleum, but we may also employ cracked napthas and particularly cracked napthas of low unsaturation from thermal or catalytic cracking. The napthas preferred for our process are those containing a high concentration of cycloparaffinic hydrocarbons and more particularly hydroaromatic hydrocarbons. In order to obtain the best yields of toluene we prefer to employ a naptha fraction having a boiling range embracing the boiling point of toluene, i. e. 232° F. A fraction having initial and final boiling points within 25° F. of the boiling point of toluene is very desirable and it is undesirable to employ a naptha fraction having initial and final boiling points more than about 50° F. away from the boiling point of toluene. A light naptha fraction having an initial boiling point of about 180° F. and a final boiling point of about 280° F. is characteristic of the widest hydrocarbon fraction which it is desirable to subject to catalytic treatment by our process. Since poor fractionation will often produce a considerable variation in the initial and final boiling points, it is somewhat preferable to control the boiling range of the naptha by the 10% and 90% points, ASTM. A naptha having a 10% point of 200° F. or above and a 90% point of 250° F. or below is very satisfactory.

Referring to the drawing, petroleum naptha or gasoline is charged to the process by line 10 and vaporized in coil 11 of furnace 5. The vapors are conducted by transfer line 12 to fractionator 1 where heavy naptha is discarded as a residue by line 13, while light hydrocarbons undesirable for our process are withdrawn by vapor line 14. The desired naptha fraction is trapped out of the column by line 15 leading to stripper 16 wherein further fractionation takes place and undesirably light hydrocarbons are returned to the main column by vapor line 17. The desired fraction, for example a fraction boiling from about 200 to 260° F. is withdrawn by line 18 and forced thru heater 6 where it is heated in coil 19 to the desired conversion temperature or somewhat above. The hot hydrocarbons are conducted by transfer line 20 to reactor 2. Hydrogen may be charged to the process by line 21, and hydrogen-containing gas may be recycled by line 22 and coil 23 The amount of hydrogen is suitably about 1 to 5 mols per mol of hydrocarbon treated and, in general, about 3 mols of hydrogen is a satisfactory amount. This corresponds roughly to 2500 cubic feet per barrel of naptha. The hydrogen may be introduced directly into the naptha fraction and simultaneously heated with the naptha in coil 19, or it may be separately heated and introduced into the oil or directly into the reactor 2.

Reactor 2 is charged with the catalyst in granular or pelleted form. The hydrocarbons pass downward thru the catalyst bed and the converted products may be withdrawn by line 24. Other methods of contacting the naptha with the catalyst may be employed without departing from our invention. For example, the catalyst may be supplied in the form of a powder and maintained suspended in the reaction vessel. In this case, deactivated catalyst may be withdrawn as a fluid from time-to-time or continuously regenerated and returned to the system.

Reactor 2 is preferably operated under pressures of the order of 50 to 500 p. s. i., and a temperature preferably in the range of 900 to 1050° F. Somewhat lower or higher temperatures may be employed, e. g. temperatures as low as 850° F. may be employed with low space velocities and temperatures as high as 1100° F. may be maintained with high space velocities.

The space velocity employed is usually within the range of about 0.1 to 5 volumes of naptha per hour per gross volume of catalyst, a space velocity of 0.5 to 2 being most commonly employed. The volume of naptha referred to in indicating the space velocity is the liquid volume of the naptha charged at standard temperature conditions, while the volume of catalyst referred to is the gross volume occupied by the catalyst, not the net volume of the catalyst when corrected for voids. It should be understood that the amount of toluene produced can be generally increased by operating at lower space velocities and/or higher temperatures, but that in general gas losses are increased at the same time. When using our toluene directive catalysts it is possible to effect conversion at reasonable space velocities, for example, 1 to 2 V. H. V. producing high yields of toluene with only moderate gas losses.

The reaction products from 2 pass, by line 24, thru cooler 25 and thence by line 26 to gas separator 27, thence to fractionator 3 wherein a heavy aromatic fraction is separated and withdrawn by line 28. This heavy fraction, substantially free of toluene, may be employed in the manufacture of motor fuels, aviation gasoline, etc., for example by blending with the naptha fractions eliminated in fractionator 1 by lines 13 and 14. It may also be used as a solvent in paints, varnishes, etc. A lighter fraction containing substantially all of the toluene produced is withdrawn as a side stream by line 29. A crude light fraction substantially free of toluene is withdrawn by vapor line 30. Fixed gases including hydrogen are withdrawn from separator 27 by line 31 and recycled by blower 32 and line 22 back to the reactor, preferably after being heated to reaction temperature or above by heating coil 23 located in furnace 6, as previously described. The amount of gas recycled in this way depends on the net gas production, the hydrogen concentration of the gas and other factors. Excess gas may be withdrawn by valved outlet 34. This recycle gas may be enriched with respect to hydrogen content by including an absorber (not shown) in the recycle system to remove low boiling hydrocarbons and thus raise the hydrogen concentration in the recycle gas.

The crude toluene fraction is conducted by line 29 to fractionator 4 which is preferably an efficient fractionating tower with a large number of plates. In this tower the toluene is withdrawn as a side stream by trapout line 35 leading to stripper 36, the vapors being returned to the main tower by line 37, while the toluene is withdrawn from the system by line 38. On account of the presence of a small amount of paraffinic hydrocarbons boiling near the toluene boiling point, it is not practicable to recover all the toluene from the products by fractional distillation. Therefore, in practice the amount of substantially pure, nitration grade toluene recovered from the crude toluene fraction is about 70–80 percent. Some additional toluene and close-boiling paraffinic hydrocarbons are present in fractions boiling just above and just below the toluene boiling point. A heavier fraction is withdrawn as a condensate from fractionator 4 by line 39 and recycled by line 40 to the conversion step.

Hydrocarbons boiling below toluene are withdrawn as a vapor stream by line 41 and further fractionated in fractionator 42. Substantially all the toluene carried away with the light products is collected as a condensate in the base of fractionator 42 whence it is conducted by line 43 back to the conversion step of the process. Benzene and other light hydrocarbons are withdrawn by line 44 to condenser 45 and receiver 46, whence they are discharged by line 47. Paraffins may be recovered from this fraction by further fractionation and/or chemical treatment or the benzene fraction may be employed in the manufacture of high knock rating motor fuels, aviation gasoline, etc., for example by blending with the naptha fractions eliminated in tower 1 thru lines 13 and 14. The tower 46 is vented by line 48.

In recycling the fractions bordering on toluene, i. e. the stocks recycled thru lines 39 and 43, we obtain, in effect, a catalytic purification of this intermediate material from which it has heretofore been difficult to recover the toluene. The toluene contained therein passes thru the catalytic reactor 2, substantially unchanged, while non-aromatic hydrocarbons boiling near the boiling point of toluene are converted into additional toluene and/or other products of different boiling points by the action of the catalyst. Some alkylation of recycled benzene also appears to take place in reactor 2, thereby forming additional toluene.

After the conversion operation has proceeded for a period of time, usually about six hours, the activity of the catalyst is diminished by an accumulation of carbonaceous deposits which must be removed. This is accomplished by passing an oxygen-containing regeneration gas thru the catalyst. The stream of naptha entering reactor 2 is interrupted or diverted and air or other oxygen-containing gas is introduced by line 49 under carefully controlled conditions to prevent overheating the catalyst. Spent regeneration gas is withdrawn by line 50. The heat evolved during regeneration may be dissipated in various ways, for example, by cooling coils, not shown.

The toluene fraction withdrawn by line 38 will ordinarily contain upwards of 95% toluene and it is feasible to operate with toluene concentration above 98%. We may control the fractionation in tower 4 to produce nitration grade toluene directly from the process without the necessity of any solvent extraction or chemical treatment whatever. This desirable result has not been possible with catalysts employed heretofore because of the relatively larger amount of non-aromatic hydrocarbons occurring in the products, having boiling points close to the boiling point of toluene and inseparable therefrom by fractionation. The use of our new catalysts has made it possible for us to produce nitration grade toluene directly from the catalytic conversion process with no decrease in toluene yield but with even greater yield than obtainable by the previous processes. The toluene fraction may be submitted to additional purification by extraction with a selective solvent, by extractive distillation using a solvent such as phenol, nitromethane, etc., or by a chemical treatment when desired to prepare the toluene for some special purpose.

The catalysts which we employ and which we term "toluene directive catalysts" are comprised of aluminum oxide of high purity promoted with molybdenum. They may be prepared conveniently by dissolving metallic aluminum under conditions to produce an alumina sol, after which the sol is converted to alumina gel. In forming the dry gel from the sol it is desirable to coagulate the sol to a firm, solid, vibrant jelly which is dried and ignited as will be described hereinafter. The alumina is promoted with molybdenum which may be applied either before or after the formation of the gel, the latter method producing a more toluene-directive catalyst.

Another method of preparing our specially pure aluminum oxide catalyst is by precipitation of aluminum hydroxide from aluminum salts of high purity followed by extensive washing until the wash water shows no qualitative test for extraneous metals, particularly metals of the iron group and the alkali metals. On account of the gelatinous nature of aluminum hydroxide it has heretofore been substantially impossible to wash extraneous metals therefrom completely, apparently because of their colloidal adsorptive retention. We have found that if the aluminum hydroxide paste obtained on precipitation is solidly frozen and thereafter thawed, the gelatinous character is largely destroyed and washing is greatly facilitated. After complete removal of extraneous metals the alumina obtained in this way is dried and ignited, and the molybdenum promoter is added.

For the purpose just described, aluminum hydroxide may be precipitated from aluminum chloride, aluminum nitrate, aluminum sulfate, or other soluble aluminum salt, by the addition of ammonia to the salt solution.

The catalyst may be prepared from metallic aluminum by the method described in U. S. Patent 2,274,634. The general procedure involved requires amalgamation of the aluminum metal, for example aluminum in the form of foil or granules is amalgamated and converted into an alumina sol in the presence of dilute acid. A weak organic acid such as acetic or formic acid at a concentration of about 1 to 6 percent is satisfactory. Other weak acids may be used such as citric, chloroacetic, etc.

The amalgamation may be accomplished by adding a mercury salt or mercuric oxide to the acid solution before adding the aluminum. Rapid solution of the metal takes place with the formation of a sol which in the case of formic acid is more fluid than that obtained with acetic acid. The sol may be coagulated by adding an electrolyte such as ammonium carbonate and in the case of more highly concentrated sols, coagulation may occur spontaneously when standing or on heating. The coagulated sol is then dried slowly in a current of warm, dry air and the dried alumina is ignited, for example by heating to a temperature of about 1100° F. and holding at that temperature about twenty-four to forty-eight hours. Organic acids adsorbed on the alumina produce a certain amount of carbonization on heating, and carbon so produced is burned away by air during the ignition step, care being taken to control the rate of burning to avoid overheating the alumina and impairing its catalytic activity. Where formic acid is used in preparing the sol, carbonization is minimized.

As indicated hereinabove, the molybdenum promoter may be added to the alumina during preparation or after ignition and we have found that when the promoter is added after ignition the resulting catalyst is more highly directive for the formation of toluene than when the promoter is added before ignition, for example while the alumina is in the sol form. Thus in comparing two catalysts, one in which the molybdena is added to the alumina sol, and the other in which the molybdena is added to the ignited alumina, we find that whereas the aromatization characteristics are substantially the same, each catalyst producing approximately the same amount of aromatics, the distribution of aromatics is quite different, the alumina promoted after ignition giving a higher yield of toluene. The explanation of this phenomenon is not understood.

The amount of promoter employed is usually about 5 to 10 percent of molybdenum oxide based on the weight of the catalyst and we may use somewhat greater amounts, for example 15 to 20 percent. A convenient way of applying the promoter is by means of the ammonium molybdate salt which is easily water-soluble and may be added in solution. Thus when applying the molybdena to pure aluminum oxide ignited at 800 to 1100° F., the ammonium molybdate solution can be applied directly to the alumina, which is then dried and reignited.

After preparing the catalyst as hereinabove described, we prefer to grind it to approximately 30 to 100 mesh and pellet the resulting powder in a suitable pelleting machine. An organic binder such as rosin, stearine pitch, etc., may be employed for this purpose, the binder being removed subsequently by heating and igniting.

After operating our process for a period of hours, for example one to twenty hours, the activity of the catalyst becomes impaired by an accumulation of carbonaceous deposits. Six hours is a convenient time of operation. It is then necessary to interrupt the conversion operation and regenerate the catalyst by contacting it with air or other oxygen-containing gas, as mentioned hereinabove. The use of regeneration gas containing a relatively small amount of oxygen, e. g. 1 to 5 percent, facilitates the operation. Control of regeneration is improved by retaining the catalyst in small diameter tubes surrounded by a cooling medium. After regeneration the catalyst is ready for further contacting of hydrocarbon vapors and it may be reused and regenerated an indefinite number of times. An outstanding characteristic of our catalysts made from pure alumina is their high thermal stability. Thus we have found that the catalytic activity actually increases in use for a period of time before it reaches a constant activity level where it remains for a long period of time.

The following data show the results obtained in the production of toluene by our process:

A Mid-Continent straight-run light naptha having a boiling range of 196 to 258° F., and A. S. T. M. distillation shown in the table, was treated with a catalyst prepared in the following way: Amalgamated aluminum was dissolved in acetic acid beginning with about 1 per cent concentration and later adding additional acid to bring the concentration to 2% as the aluminum dissolved. The resulting alumina sol containing about 6% of $Al_2O_3$ congealed to a solid jelly on standing. The jelly was dried and ignited for twenty-four hours at 1100° F. It was then treated with ammonium molybdate solution, dried and further ignited at 1000° F., 9 percent molybdenum oxide being impregnated in the catalyst in this way

*Inspection of Mid-Continent light naptha feed stock*

Gravity A. P. I. _____ 61.0
A. S. T. M. distillation, °F.:
    Initial _____ 196
    10% _____ 208
    20% _____ 211
    30% _____ 213
    40% _____ 216
    50% _____ 219
    60% _____ 222
    70% _____ 227
    80% _____ 231
    90% _____ 239
End point _____ 258
Analysis:
    Aromatics, vol. per cent—
        Benzene _____ 0.3
        Toluene _____ 2.2
        Xylenes _____ 0.7
            Total _____ 3.2
    Napthenes, vol. per cent—
        Initial, 205° F _____ 12.9
        205–228° F _____ 13.1
        228–255° F _____ 12.7
        255–270° F _____ 2.2
            Total _____ 40.9
    Paraffins, vol. per cent—
        Initial, 205° F _____ 22.3
        205–228° F _____ 11.8
        228–255° F _____ 16.1
        255–270° F _____ 4.3
            Total _____ 54.5
Residue (not examined) _____ 1.4
                            100.0

The naptha referred to was passed in a stream thru the catalyst under a pressure of 200 p. s. i. gage for a period of six hours, employing 2500 cubic feet of hydrogen per barrel (42 gallons) of naptha treated. The following results were obtained as an average of three successive six-hour reaction periods with the same catalyst, regenerating the catalyst between runs, and as an average of two reaction periods at about double the space velocity. Data obtained with a commercial catalyst are included for comparison.

| | Alumina gel catalyst | | Commercial catalyst | |
|---|---|---|---|---|
| | Average of 3 runs | Average of 2 runs | Average of 7 runs | Average of 2 runs |
| Temperature, °F | 985 | 970 | 978 | 978 |
| Space velocity | 1.00 | 2.01 | 0.94 | 1.9 |
| Yields, output basis: | | | | |
|   Vol. per cent liquid product | 56.0 | 63.6 | 73.3 | 83.7 |
|   Wt. per cent dry gas | 39.1 | 32.1 | 23.1 | 13.5 |
|   Wt. per cent carbon | 0.32 | 0.14 | 0.18 | 0.1 |
| Gravity of liquid product | 46.3 | 48.0 | 52.6 | 55.4 |
| Toluene, vol. per cent: | | | | |
|   In liquid product | 34 | 25.2 | 21.3 | 15.5 |
|   In cut 204–255° F | 97.8 | 79.8 | 59.4 | 35.0 |
|   Yield based on naptha feed | 19.0 | 16.0 | 15.6 | 12.9 |

The commercial catalyst was an Activated Alumina containing about 9% of molybdenum oxide. It will be seen from the data that at a space velocity of about 1 our improved catalyst shows an increase in toluene production from 15.6 to 19% which is approximately 22%. At the higher space velocity of approximately 2, the increase was from 12.9 to 16%, exactly 24% increase.

Still more striking is the toluene concentration in the fraction 204 to 255° F. This figure gives an indication of the completeness of the conversion of paraffins and napthenes to toluene. At approximately unit space velocity the toluene purity in this fraction increased from 59.4 to 97.8%, almost double, while at the higher space velocity of approximately 2, the increase was more than double.

Another catalyst was prepared from amalgamated aluminum in the same way as that just described except that the alumina sol was coagulated by the addition of ammonium carbonate and ammonium molybdate, sufficient ammonium molybdate solution being added to the sol to provide a catalyst containing about 9% of molybdenum oxide, $MoO_3$. The catalyst was then dried and ignited. This catalyst, which may be termed a "co-gelled catalyst," was employed with the same naptha under the same conditions as just described and gave the following results at two different space velocities:

| | Average of two 6-hr. runs | Average of two 6-hr. runs |
|---|---|---|
| Temperature | 972 | 975 |
| Space velocity | 1.0 | 1.99 |
| Yields, output basis: | | |
|   Vol. per cent liquid product | 60.5 | 68.4 |
|   Wt. per cent dry gas | 35.1 | 28.3 |
|   Wt. per cent carbon | 0.13 | 0.1 |
| Gravity of liquid product API | 48.9 | 52.2 |
| Toluene, vol. per cent: | | |
|   In liquid product | 28.5 | 22.0 |
|   In cut 204–255° F | 87.9 | 68.0 |
|   Yield based on naptha feed | 17.2 | 15.1 |

It will be observed from these data that the catalyst in which the molybdenum oxide promoter is co-gelled with the alumina is considerably less effective in producing toluene than the catalyst in which substantially the same alumina was promoted with molybdenum oxide, applied subsequent to ignition of the alumina. The total aromatics produced by the two catalysts were found to be substantially the same. Apparently the toluene-directive action of the catalyst is considerably influenced by the method of adding the promoter element, the toluene production being improved by adding the promoter to the alumina after ignition. An examination of the data just presented shows 17.2% average yield of toluene from the co-gelled catalyst and 19% from the catalyst promoted after ignition, an increase of 10.5% in this case, operating under the same conditions with the same space velocity. Space velocity is the volume of liquid naptha per hour charged per gross volume of catalyst. Thus if two barrels of naptha are charged per hour thru one barrel of catalyst, the space velocity is 2.

In order to determine the chemical changes occurring in the catalytic process, we made analyses of the products obtained from two runs made with the best commercial catalyst available and two runs made with the impregnated alumina gel catalyst from amalgamated aluminum. Products obtained from runs made at two different space velocities, approximately 1 and approximately 2, were tested. The conditions were 980° F., 200 p. s. i., and 6-hour reaction periods with about 2500 cubic feet of hydrogen per barrel. The results are shown in the following table:

|  | Naptha (feed) | Alumina gel catalyst | | Commercial catalyst | |
|---|---|---|---|---|---|
| Space velocity, Vn/hr./Vc | | 2.01 | 1.00 | 1.90 | 0.94 |
| Yields based on feed: | | | | | |
| Carbon_____Wt. per cent__ | | 0.14 | 0.19 | 0.10 | 0.16 |
| Dry gas_____do____ | | 25.5 | 33.1 | 10.8 | 20.9 |
| C4's_____per cent__ | | 9.7 | 11.8 | 3.0 | 6.3 |
| C5's_____do____ | | 5.5 | 7.3 | 4.4 | 4.7 |
| 120–204° F.: | | | | | |
| Benzene_____do____ | 0.3 | 3.1 | 4.4 | 2.3 | 3.1 |
| Napthenes and paraffins per cent__ | 35.2 | 10.2 | 3.3 | 28.2 | 22.1 |
| 204–255° F.: | | | | | |
| Toluene_____do____ | 2.2 | 16.0 | 19.0 | 13.0 | 15.8 |
| Napthenes and paraffins per cent__ | 53.7 | 4.1 | 0.4 | 23.2 | 10.7 |
| 255–300° F.: [1] | | | | | |
| Xylenes_____do____ | 0.7 | 12.7 | 11.6 | 11.0 | 11.9 |
| Napthenes and paraffins per cent__ | 6.5 | 0.2 | 0 | 1.2 | 0.5 |
| Above 300° F.: [2] | | | | | |
| Higher aromatics____do____ Higher napthenes+paraffins_____per cent__ | 1.4 | 2.9 | 2.6 | 1.5 | 1.6 |

[1] 255–270° F. in case of feed.
[2] Above 270° F. in case of feed.

NOTE.—Percentage is by volume except where indicated.

As indicated hereinabove, we prefer to prepare our toluene directive catalyst from metallic aluminum, first forming an alumina sol, then a gel. Metallic aluminum of high purity should be used for this purpose. All reagents should be substantially free of other metals except the desired promoter and we have found that the alkali metals in particular are objectionable. The catalyst made from aluminum metal is substantially free of sodium, containing not more than about .01 percent of this element. We prefer that the alkali metal content of our catalyst be not more than 0.1 percent.

If the alumina is prepared by precipitation from an aluminum salt, it is important to employ an aluminum salt, for example aluminum nitrate, which is substantially free of alkali metal salts. This objective may be attained readily when sublimed aluminum chloride is employed for preparing the catalyst. The use of distilled water and glass, wood or ceramic mixing vessels in making up the catalyst is important to prevent contamination.

Having thus described our invention what we claim is:

1. The process of making toluene in high concentration from petroleum naptha which comprises contacting said naptha at a conversion temperature within the range of about 850 to 1100° F. with a catalyst substantially free of alkali metals consisting essentially of alumina gel promoted with about 5 to 10 per cent of molybdenum oxide, the boiling range of said naptha lying within about 50° F. of the boiling point of toluene, supplying to the reaction zone about 1 to 5 mols of hydrogen per mol of naptha treated and recovering toluene from the reaction products, said alumina gel having been prepared by dissolving amalgamated metallic aluminum in a weak acid thereby forming an alumina sol, gelling said sol, drying and igniting the resulting alumina gel, and applying the molybdenum promoter to the gel subsequent to igniting by impregnating said gel with a solution of a soluble compound of molybdenum and re-igniting the catalyst.

2. The process of claim 1 wherein the catalyst employed has an alkali metal content less than 0.1 per cent by weight.

3. The process of producing toluene in high concentration from petroleum which comprises contacting a naptha boiling within the range of 196 to 258° F. at a temperature of about 850 to 1100° F., with an alumina gel catalyst substantially free of alkali metals and impregnated with about 5 to 20 per cent of molybdenum oxide, maintaining the pressure within the catalytic reaction zone in the range of about 50 to 500 p. s. i., feeding said naptha at a space velocity of about 0.5 to 5 volumes per hour per volume of catalyst in the reaction zone, introducing into said reaction zone about 1 to 5 mols of hydrogen per mol of naptha treated and recovering toluene from the reaction products, said alumina gel having been prepared by dissolving amalgamated metallic aluminum in a dilute organic acid selected from the class consisting of acetic and formic acids, starting the solution in an acid of about 1% concentration and subsequently increasing the concentration until an alumina sol containing from about 4 to 10 percent $Al_2O_3$ is obtained, dehydrating said sol to alumina gel of low moisture content, and heating said alumina gel in an atmosphere of controlled oxygen content to remove adsorbed organic acid.

4. The process of making toluene in high concentration from petroleum which comprises contacting, in a reaction zone, a petroleum naptha boiling in the range of 196 to 258° F. with a catalyst consisting essentially of alumina gel promoted with about 5 to 10 per cent of molybdenum oxide, the said catalyst being substantially free of alkali metals, maintaining said reaction zone at a temperature of about 900 to 1050° F. and a pressure of about 50 to 500 pounds per square inch, introducing into said reaction zone about 1 to 5 mols of hydrogen per mol of naptha hydrocarbon treated, charging said naptha to the reaction zone at a space velocity of about 0.1 to 5 volumes of liquid naptha per hour per gross volume of catalyst in the reaction zone, and recovering toluene from the reaction products, said alumina gel catalyst having been prepared by dissolving amalgamated metallic aluminum in a weak acid thereby forming an alumina sol, coagulating said sol to a firm, vibrant gel, drying and igniting the resulting gel, and impregnating said gel with a solution of a soluble compound of molybdenum which on ignition will be converted to molybdenum oxide.

5. The process of making toluene from petroleum in high concentration sufficiently free from contaminating non-aromatic hydrocarbons of similar boiling points to permit the recovery of substantially pure toluene by direct distillation of the products which comprises contacting, in a reaction zone, at a temperature of about 900 to 1050° F. a naptha boiling within the range of 180 to 280° F. with a catalyst consisting essentially of alumina gel promoted with about 5 to 10 per cent of molybdenum oxide and substantially free of alkali metals at a pressure of about 50 to 500 pounds per square inch and in the presence of about 1 to 5 mols of added hydrogen per mol of naptha hydrocarbon treated, charging said naptha to the catalytic reaction zone at a space velocity of about 0.1 to 5 volumes of liquid naptha per hour per gross volume of catalyst in the reaction zone, and recovering toluene from the reaction products by direct distillation, said alumina gel having been prepared by dissolving amalgamated metallic aluminum in a weak acid thereby forming an alumina sol, gelling said sol, drying and igniting the resulting gel, and impregnating said gel with a solution of a soluble compound of molybdenum which on ignition will be converted to molybdenum oxide.

6. The process of making toluene from petroleum in high concentration sufficiently free from contaminating non-aromatic hydrocarbons of similar boiling points to permit the recovery of substantially pure toluene by direct distillation of the products which comprises contacting, in a reaction zone, at a temperature of about 900 to 1050° F. a naptha boiling within the range of 180 to 280° F. with a catalyst consisting essentially of alumina gel promoted with about 5 to 10 per cent of molybdenum oxide and substantially free of alkali metals at a pressure of about 50 to 500 pounds per square inch and in the presence of about 1 to 5 mols of added hydrogen per mol of naptha hydrocarbon treated, charging said naptha to the catalytic reaction zone at a space velocity of about 0.1 to 5 volumes of liquid naptha per hour per gross volume of catalyst in the reaction zone, and recovering toluene from the reaction products by direct distillation, said alumina gel catalyst having been prepared by dissolving amalgamated metallic aluminum in a weak acid to form an alumina sol, then gelling the sol by adding a solution of electrolyte, drying and igniting the resulting gel, and impregnating said gel with a solution of a soluble compound of molybdenum which on ignition will be converted to molybdenum oxide.

7. The process of making toluene of high concentration from petroleum which comprises contacting a petroleum naptha boiling within the range of 180° to 280° F. with a porous solid catalyst consisting essentially of alumina gel prepared by dissolving amalgamated aluminum metal in a weak acid, gelling the resulting sol, drying and igniting the resulting gel and promoting it with about 5 to 10 per cent of molybdenum oxide by impregnating it with a solution of a molybdenum compound which on ignition will be converted to molybdenum oxide, then igniting said impregnated gel, maintaining a space velocity within the range of about 0.5 to 5 volumes of naptha per hour per gross volume of catalyst in the reaction zone, maintaining the reaction temperature at about 900 to 1050° F. and a pressure of about 50 to 500 pounds per square inch, supplying to the reaction zone about 1 to 5 mols of hydrogen per mol of naptha treated, fractionating the reaction products into a substantially pure toluene fraction, a heavy substantially toluene-free xylene fraction, a light substantially toluene-free benzene fraction, and at least one intermediate boiling fraction containing toluene and non-aromatic hydrocarbons boiling close to toluene, recycling said intermediate boiling fraction to said catalytic conversion step, thereby converting said non-aromatic hydrocarbons into aromatic hydrocarbons and products having boiling points less close to the boiling point of toluene than the boiling point of said non-aromatic hydrocarbons in said intermediate fraction and subsequently separating said last-mentioned products from toluene in said fractionation step.

JAMES C. BAILIE.
RODNEY V. SHANKLAND.